(12) United States Patent
Meldrum

(10) Patent No.: US 6,867,751 B1
(45) Date of Patent: Mar. 15, 2005

(54) METHODS AND APPARATUS FOR ADJUSTING THE DISPLAY CHARACTERISTICS OF A DISPLAY UNIT

(75) Inventor: Richard M. Meldrum, Glendale, AZ (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/224,217

(22) Filed: Dec. 30, 1998

(51) Int. Cl.[7] .............................................. G09G 5/00
(52) U.S. Cl. ........................................ 345/7; 345/207
(58) Field of Search ............................. 345/7, 9, 207, 345/147, 32, 82, 8, 102; 340/945, 425.5, 815.42, 815.41, 815.5, 825.06, 436, 438, 439, 701, 2, 980; 701/32, 33, 36; 350/345; 349/11

(56) References Cited

U.S. PATENT DOCUMENTS

| | | | | |
|---|---|---|---|---|
| 4,410,841 A | * | 10/1983 | Dusard et al. ............. | 315/382 |
| 4,740,081 A | * | 4/1988 | Martens et al. ............ | 356/479 |
| 4,760,389 A | * | 7/1988 | Aoki et al. ................. | 340/719 |
| 4,880,305 A | * | 11/1989 | Salt .......................... | 356/141.3 |
| 4,997,263 A | * | 3/1991 | Cohen et al. ............... | 350/345 |
| 5,095,514 A | * | 3/1992 | Curtis ........................ | 385/12 |
| 5,406,305 A | * | 4/1995 | Shimomura et al. ........ | 345/102 |
| 5,428,265 A | * | 6/1995 | Booth et al. ................ | 315/158 |
| 5,459,805 A | * | 10/1995 | Foster ........................ | 385/74 |
| 5,633,494 A | * | 5/1997 | Danisch ..................... | 250/227 |
| 5,949,331 A | * | 9/1999 | Schofield et al. ........... | 340/461 |
| 6,100,943 A | * | 8/2000 | Koide et al. ................ | 345/7 |
| 6,144,359 A | * | 11/2000 | Grave ........................ | 345/102 |

* cited by examiner

Primary Examiner—Xiao Wu

(57) ABSTRACT

A transmission line transmits light from a remote source to a light sensor affixed to a display unit to provide a variation in the display characteristics of the display unit based at least in part upon the remote light intensity. A reception end is integrally formed as part of the transmission line and is physically separated from the light sensor. The reception end gathers the remote light for transmission by the transmission line. An emission end is integrally formed as part of the transmission line and presents the remote light, transmitted by the transmission line, to the light sensor such that the variation in the display characteristics of the display unit may be provided based at least in part upon the remote light intensity.

30 Claims, 3 Drawing Sheets

METHODS AND APPARATUS FOR ADJUSTING THE DISPLAY CHARACTERISTICS OF A DISPLAY UNIT

BACKGROUND OF THE INVENTION

1. Technical Field

The present invention generally relates to vehicle displays and, more particularly, to methods and apparatus for adjusting the display characteristics of a display unit.

2. Background Information

Display systems are becoming vital components in a wide range of vehicles, including, but not limited to, automobiles, ships, aircraft, and spacecraft. These display systems provide a visual presentation of the information and data detected by sensors and generated by other vehicle systems. This enables the vehicle operator to monitor the vehicle status and operating environment such that the vehicle may be controlled in an efficient manner. For example, navigation information, engine data, structural data, warning information, and radar topographies may be presented by a display system for operator viewing. While operators are generally able to rapidly absorb and process a substantial amount of information produced on a screen of a display system, variations in the display characteristics are generally desirable to ease the operator's task in high workload situations and improve the operator-display interaction.

To appreciate the improvement in operator-display interaction as a result of varying the display characteristics of a display unit, consider the following example. When an airplane is flying into a setting sun, the pilot's eyes adjust by reducing the pupil apertures to compensate for the bright intensity on the horizon. When the pupils are contracted in such a fashion and the pilot looks at the display, the amount of light entering the pilot's eyes from the display unit is limited by the pupils, thereby making it difficult to view the information illuminated on the screen. In addition, when the sun shines into a cockpit window other than the front windshield, or a light source exists behind the pilot, there is a tendency for the light to reflect off of the display unit screen making it difficult for the pilot to view the information on the screen.

To compensate for the above-referenced situations and others not specifically mentioned, most airplane display units have a light sensor, such as a photodiode, affixed to the display unit. The photodiode detects the light intensity level in a semi-defined area in front of the display and generates an electrical signal proportional to the light intensity. The electrical signal generated by the photodiode is provided to circuitry within the display unit for adjustment of the display characteristics (e.g., illumination intensity, color, contrast, and/or the like). When the photodiode detects a low light level in the cockpit, a low illumination intensity of the display unit will be adequate for operator viewing and the circuitry within the display unit adjusts the display characteristics accordingly. However, when the photodiode senses a high light level in the cockpit, a low illumination intensity of the display unit is not generally sufficient to provide ease in operator viewing. Therefore, the circuitry within the display unit directs an increase in the illumination intensity of the display. While this arrangement provides a certain degree of compensation, a problem arises when the photodiode does not detect the full intensity of the light source focused on the upper torso or even the eyes of the pilot. This is typically attributable to the fact that the detection area of the display unit's photodiode is limited to the region directly in front of the display screen, and this may not present an accurate indication of the light that is affecting the pilot's view of the screen.

Some systems compensate through the installation and use of a remote sensor circuit that includes a remote photodiode near the front windshield to measure the light entering the cockpit. While this diminishes the problem associated with the inadequate measurement by the single photodiode affixed to the display screen, several disadvantages are introduced with the addition of a remote sensor circuit. One disadvantage of the remote sensor circuit is the increase in cost, as such components are generally expensive and tend to lack reliability. In addition, as the circuit components used in the remote sensor circuit already reside in the display unit and a photodiode is originally affixed to the display unit, a duplication in circuitry and photodiodes results. Furthermore, since the remote sensor circuit receives power and transmits signals through a cable attached to the connector on the display unit, connector pins are taken that might otherwise be available for other functions.

BRIEF SUMMARY OF THE INVENTION

In accordance with one aspect of the present invention, a system for varying the display characteristics of the display unit based, at least in part, upon a remote light intensity including a transmission line configured to transmit light from a remote source to a light sensor. A reception end is physically separated from the light sensor and gathers the remote light for transmission by the transmission line. An emission end presents the remote light, transmitted by the transmission line, to the light sensor.

In accordance with another aspect of the present invention, a method of delivering remote light to a light sensor affixed to a display unit to vary the display characteristics based, at least in part, upon the remote light intensity comprises the steps of gathering the remote light with the reception end physically separated from the light sensor; transmitting the remote light, gathered by the reception end, with the transmission; and presenting the remote light, transmitted by the transmission line, to the light sensor.

The system detects light remote from the photodiode affixed to the display unit, is relatively inexpensive, reliable, does not need to be powered, and utilizes the photodiode and associated circuitry that are already affixed to the display unit.

BRIEF DESCRIPTION OF THE DRAWINGS

The subject invention is described in conjunction with the appended drawing figures, wherein like numerals denote like elements, and.

DETAILED DESCRIPTION OF PREFERRED EXEMPLARY EMBODIMENTS

The ensuing description is a preferred exemplary embodiment only, and is not intended to limit the scope, applicability, or configuration of the invention in any way. Rather, the ensuing descriptions provide a convenient description for implementing preferred embodiments of the invention, it being understood that various changes may be made in the function and arrangement of elements described in an exemplary preferred embodiment without departing from the spirit and scope of the invention as set forth in the appended claims.

Figure 1:
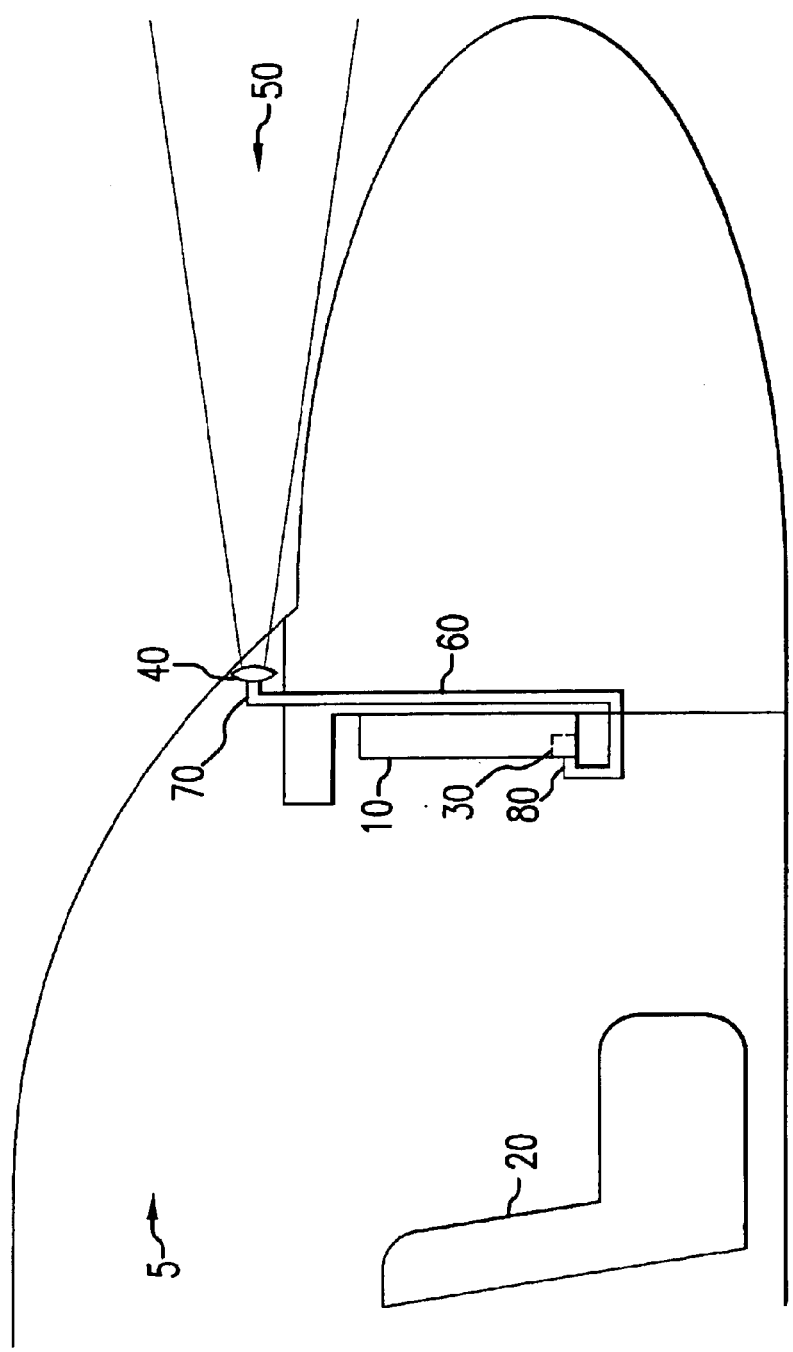
FIG. 1 is an illustration of a preferred embodiment of the present invention in the context of an airplane cockpit having a system for adjusting the display characteristics of a display unit.

FIG. 1 is a side view of an airplane cockpit 5 showing a system according to various aspects of the present invention. While the following description of exemplary preferred embodiments is described in the context of an aircraft, it should be understood to be illustrative only and should not be considered to limit the invention to an aircraft. More appropriately, is should be understood that the invention is applicable in any number of environments in which a display unit is operated according to variable lighting conditions, such as automobiles, trains, ships, spacecrafts, or the like.

Continuing with FIG. 1, a display unit 10 faces the pilot's chair 20. A light sensor 30 is affixed to the display unit 10 and configured to receive light from the area in front of the pilot's chair 20. The display characteristics of the display unit 10, such as color, contrast, and intensity, are adjusted according to the amount of light received by the light sensor 30.

In addition to the light sensor 30, a first optical device 40 is placed in the cockpit 5 to receive and focus remote light 50. In a preferred embodiment, the first optical device 40 is a lens that may be made out of plastic, glass, or any other material suitable for receiving and focusing light. The first optical device 40 is shown in a position near the front of the cockpit 5, facing toward the source of remote light 50. However, the first optical device 40 may be positioned at any location within the cockpit 5 depending on the direction or area of remote light 50 that is to be used to provide display adjustments.

A first transmission line 60 is connected to the first optical device 40 at a first reception end 70. The first transmission line 60 may be formed of any number of materials suitable for transmitting light, including plastic and glass for example. In a preferred embodiment, the first transmission line 60 is a fiber optic cable.

In addition to the first reception end 70, the first transmission line 60 has a first emission end 80 formed as a part of the first transmission line 60. The first emission end 80 is positioned within the detection area of the light sensor 30. The first emission end may abut the front of the light sensor 30, or there may be a space between the first emission end 80 and the light sensor 30.

It should be understood that there are many ways to form the first reception end 70 and the first emission end 80. For example, the first reception end 70 and the first emission end 80 may be formed by cutting off the ends of the first transmission line 60, resulting in a first reception end 70 and a first emission end 80 with surfaces that are substantially perpendicular to the length of the first transmission line 60. In addition, the surfaces of the first reception end 70 and the first emission end 80 may be polished. This results in a smooth surface with improved light receiving and light emitting properties. Also, the first reception end 70 and the first emission end 80 may be concave, convex, conical, or a host of other optical shapes as desired.

Continuing with FIG. 1, the remote light 50 is received by the first optical device 40. The first optical device 40 focuses the light on the first reception end 70. The first transmission line 60 transmits the light from the first reception end 70 to the first emission end 80. The first emission end 80 presents the light transmitted by the first transmission line 60 to the light sensor 30. The display characteristics of the display unit 10, such as color, contrast, and intensity, are then adjusted according to the amount of light received by the light sensor 30 at the remote location.

Figure 2:
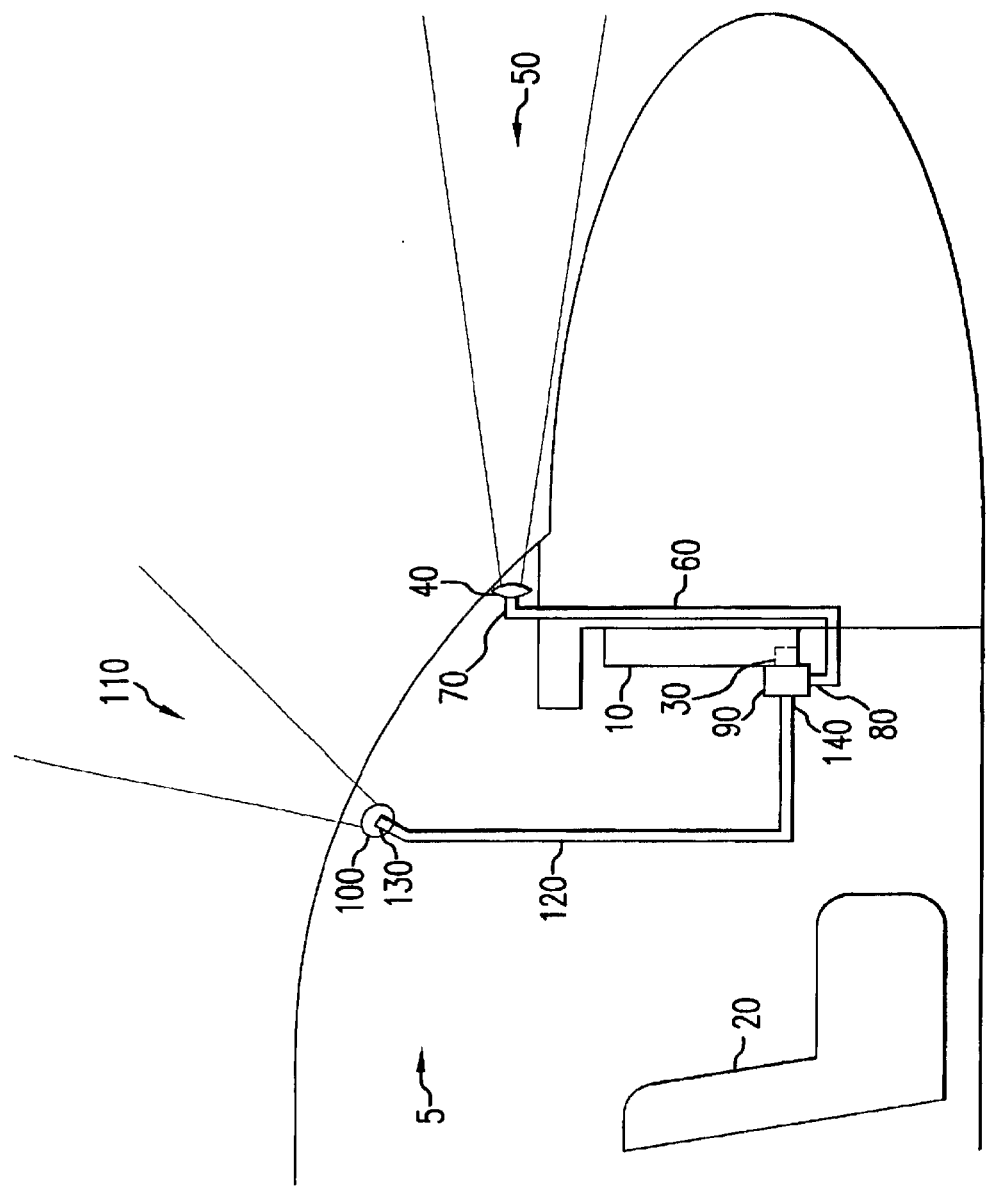
FIG. 2 is an illustration of an alternate embodiment of the present invention in the context of an airplane cockpit having a system for adjusting the display characteristics of a display unit.

Referring to FIG. 2, an alternate embodiment of a remote light delivery system according to various aspects of the present invention uses the light intensity at multiple remote locations to adjust the display characteristics of the display unit 10. More specifically, in addition to the first optical device 40, first transmission line 60, first reception end 70, and first emission end 80 providing remote light 50 to the light sensor 30, a second optical device 100, second transmission line 120, second reception end 130, and second emission end 140 suitably provide a second remote light 110 to the light sensor 30. The second optical device 100 receives the second remote light 110. The second optical device 100 is shown at a position near a side window of the cockpit 5, facing toward the source of second remote light 110. However, the second optical device 100 may be positioned anywhere in the cockpit 5, depending on the direction of the light source that is to be used for display characteristic adjustment. In a preferred embodiment, the second optical device 100 is a lens and as with the first optical device, the lens may be made out of plastic, glass, or any other material suitable for receiving and focusing light.

The second transmission line 120 may be made out of plastic, glass, or any other material suitable for transmitting light. In a preferred embodiment, the second transmission line 120 is a fiber optic cable. The second transmission line 120 has a second reception end 130 and a second emission end 140 formed as part of the second transmission line 120. There are many ways to form the second reception end 130 and the second emission end 140. For example, the second reception end 130 and the second emission end 140 may be formed by cutting off the ends of the second transmission line 120, resulting in a second reception end 130 and a second emission end 140 with surfaces that are substantially perpendicular to the length of the second transmission line 120. In addition, the second reception end 130 and the second emission end 140 may be polished. This results in a smooth surface with improved light receiving and light emitting properties. Also, the second reception end 130 and the second emission end 140 !may be concave, convex, conical, or a host of other optical shapes as desired.

The second optical device 100 is connected to the second reception end 130. The second emission end 140 is connected to a coupler 90 that also receives the first emission end 80 of the first transmission line 60. There are many ways to make these connections between the coupler 90 and the first emission end 80 and the second emission end 140, and between the second optical device 100 and the second reception end 130. One example is pigtailing the second reception end 130 to the second optical device 100, and pigtailing the second emission end 140 and the first emission end 80 to the coupler 90.

As may be appreciated from this multiple source configuration, which is not limited to a two source presentation to the light sensor 30, the remote light 50 is received by the first optical device 40 and the second remote light 110 is received by the second optical device 100. The first transmission line 60 and second transmission line 120 transmit light from the first reception end 70 to the first emission end 80 and from the second reception end 130 to the second emission end 140, respectively. The first emission end 80 and the second emission end 140 present the light transmitted by the first transmission line 60 and the second transmission line 120, respectively, to the coupler 90 which provides a combination light source to the light sensor 30 for adjustment of the display characteristics according to the amount of light received at the remote location 50 and second remote location 110.

Other embodiments of the invention exist that do not utilize all of the elements in FIG. 1. In one embodiment of the invention, the system does not contain the first optical device 40, or the second optical device 100, or both. Thus, in one instance, the first reception end 70 receives a portion of the remote light 50 directly. In a second instance, the second reception end 130 receives a portion of the second remote light 110 directly. Since the first reception end 70 and the second reception end 130 have smaller angles of view than the first optical device 40 and the second optical device 100, only a portion of the remote light 50 and the second remote light 110 is received.

In another embodiment of the invention, the system does not contain the second transmission line 120, the second reception end 130, and the second emission end 140. Thus, the second optical device 100 is connected directly to the second input of the coupler 90. In this embodiment, the first optical device 40 continues to provide remote light 50 to the first input of the coupler 90, while the second optical device 100 provides light in the vicinity of the front of the pilot's chair 20 to the second input of the coupler 90.

In a further embodiment of the invention, the system does not contain the second optical device 100, the second transmission line 120, the second reception end 130, and the second emission end 140. In this embodiment, the first optical device 40 continues to provide remote light 50 to the first input of the coupler 90, while the second input of the coupler 90 receives light in the vicinity of the front of the pilot's chair 20 without the aid of the second optical device 100. In still a further embodiment of the invention, the system contains only the first optical device 40, the first transmission line 60, the first reception end 70, and the first emission end 80. The first emission end 80 is connected directly to the light sensor 30 by pigtailing or some other appropriate connecting means. Thus, the first optical device 40 continues to provide remote light 50 to the light sensor 30.

Each of these various changes and other modifications not specifically mentioned may be made in the function and arrangement of elements described in the exemplary embodiments without departing from the spirit and scope of the invention. Furthermore, the method of delivering remote light to a light sensor affixed to a display unit in order to provide a variation in the display characteristics of the display unit based at least in part upon the remote light intensity provides for these various changes and modifications and the following method should not be construed as limiting the order in which the individual steps may be performed and the exemplary process may include more or less steps or may be performed in the context of a larger processing scheme.

Figure 3:
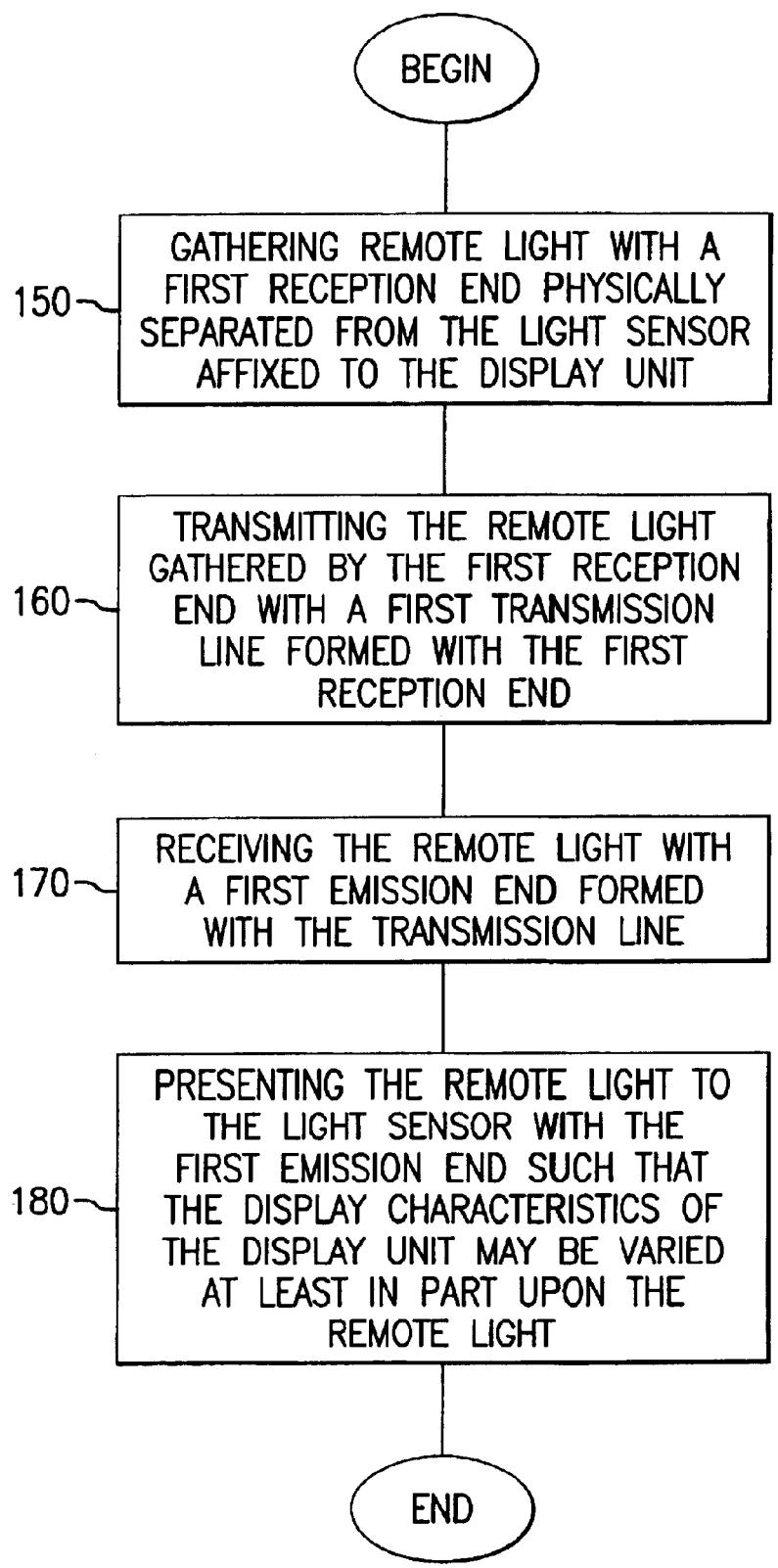
FIG. 3 is a flow chart setting forth an exemplary method for adjusting the display characteristics of a display unit.

Referring to FIG. 3, an exemplary method for delivering remote light to a light sensor affixed to a display unit in order to provide a variation in the display characteristics of the display unit based at least in part upon the remote light intensity is presented according to a preferred embodiment of the present invention. Initially, remote light is gathered with a first reception end physically separated from the light sensor affixed to the display unit 150, and the remote light gathered by the first reception end is transmitted with a first transmission line formed with the first reception end 160. The remote light is received by a first emission end formed with the transmission line 170 and presented by the first emission end to the light sensor affixed to the display unit such that the display characteristics of the display unit may be varied at least in part upon the remote light 180.

Although the invention has been described herein in conjunction with the appended drawing, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A system for delivering remote light to a light sensor affixed to a display unit in order to provide a variation in the display characteristics of the display unit based at least in part upon the remote light intensity, said system comprising:
   a first transmission line;
   a first reception end integrally formed as part of said first transmission line and physically separated from the light sensor affixed to the display unit, said first reception end gathering the remote light for transmission by said first transmission line;
   a first emission end integrally formed as part of said first transmission line, said first emission end presenting the remote light, transmitted by said first transmission line, to the light sensor affixed to the display unit such that the variation in the display characteristics of the display unit may be provided based at least in part upon the remote light intensity.

2. The system of claim 1, wherein said first reception end is physically separated from the display unit.

3. The system of claim 1, further comprising:
   a first optical device connected to said first reception end for focusing the remote light onto said first reception end.

4. The system of claim 3, wherein said first optical device comprises a lens.

5. The system of claim 4, wherein said first transmission line comprises a fiber optic cable.

6. The system of claim 1, further comprising:
   a coupler having a first input and a second input, said first input collecting the remote light from said first emission end and said second input collecting the remote light at said second input, said coupler presenting the collected light to the light sensor affixed to the display unit.

7. The system of claim 6, further comprising:
   a second optical device connected to the second input of said coupler for focusing the remote light onto the second input of said coupler.

8. The system of claim 7, wherein said second optical device comprises a lens.

9. The system of claim 6, further comprising:
   a first optical device connected to said first reception end for focusing the remote light onto said first reception end.

10. The system of claim 9, wherein said first optical device comprises a lens.

11. The system of claim 10, wherein said first transmission line comprises a fiber optic cable.

12. The system of claim 11, further comprising:
    a second optical device connected to the second input of said coupler for focusing the remote light onto the second input of said coupler.

13. The system of claim 12, wherein said second optical device comprises a lens.

14. The system of claim 1, further comprising:
a second transmission line;
a second reception end integrally formed as part of said second transmission line, said second reception end physically separated from the light sensor affixed to the display unit and physically separated from said first reception end, said second reception end gathering the remote light for transmission by said second transmission line;
a second emission end integrally formed as part of said second transmission line, said second emission end emitting the remote light transmitted by said second transmission line; and
a coupler having a first input and a second input, said first input collecting the remote light from said first emission end and said second input collecting the remote light from said second emission end, said coupler presenting the collected light to the light sensor affixed to the display unit.

15. The system of claim 14, further comprising:
a first optical device attached to said first reception end for focusing the remote light onto said first reception end.

16. The system of claim 15, further comprising:
a second optical device attached to said second reception end for focusing the remote light onto said second reception end.

17. The system of claim 15, wherein said first optical device comprises a lens.

18. The system of claim 17, wherein said second optical device comprises a lens.

19. The system of claim 18, wherein said first transmission line comprises a fiber optic cable.

20. The system of claim 19, wherein said second transmission line comprises a fiber optic cable.

21. A method of delivering remote light to a light sensor affixed to a display unit in order to provide a variation in the display characteristics of the display unit based at least in part upon the remote light intensity, said method comprising the steps of:
gathering the remote light with a first reception end physically separated from the light sensor affixed to the display unit;
transmitting the remote light, gathered by said first reception end, with a first transmission line integrally formed with said first reception end; and
presenting the remote light, transmitted by said first transmission line, to the light sensor affixed to the display unit, with a first emission end integrally formed with said first transmission line, the remote light presented such that the variation in the display characteristics of the display unit may be provided based at least in part upon the remote light intensity.

22. The method of claim 21, further comprising the step, before said gathering step, of focusing the remote light onto said first reception end with a first optical device connected to said first reception end.

23. The method of claim 21, further comprising the steps of:
collecting the remote light, presented by said first emission end, with a first input of a coupler;
collecting the remote light at a second input of said coupler; and
presenting the collected light, with said coupler, to the light sensor affixed to the display unit.

24. The method of claim 23, further comprising the step, before said collecting the remote light at a second input step, of focusing the remote light onto the second input of said coupler with a second optical device connected to the second input of said coupler.

25. The method of claim 23, further comprising the step, before said gathering step, of focusing the remote light onto said first reception end with a first optical device connected to said first reception end.

26. The method of claim 25, further comprising the step, before said collecting the remote light at a second input step, of focusing the remote light onto the second input of said coupler with a second optical device connected to the second input of said coupler.

27. The method of claim 21, further comprising the steps of:
gathering the remote light with a second reception end physically separated from the light sensor affixed to the display unit and physically separated from said first reception end;
transmitting the remote light, gathered by said second reception end, with a second transmission line integrally formed with said second reception end; and
presenting the remote light, transmitted by said second transmission line, with a second emission end integrally formed with said second transmission line;
collecting the remote light, presented by said first emission end, with a first input of a coupler;
collecting the remote light, presented by said second emission end, with a second input of said coupler; and
presenting the collected light, with said coupler, to the light sensor affixed to the display unit.

28. The method of claim 27, further comprising the step, before said gathering the remote light with a first reception end step, of focusing the remote light onto said first reception end with a first optical device connected to said first reception end.

29. The method of claim 28, further comprising the step, before said gathering the remote light with a second reception end step, of focusing the remote light onto said second reception end with a second optical device connected to said second reception end.

30. An optical system for delivering remote light to a photodiode affixed to a display unit in the cockpit of an airplane, in order to provide a variation in the display characteristics of the display unit based at least in part upon the remote light intensity, said optical system comprising:
a first lens physically separated from the display unit for focusing the remote light;
a fiber optic cable having a first end connected to said first lens for transmitting the remote light focused by said first lens;
a second lens for focusing the remote light; and
an optical coupler having a first input connected to a second end of said fiber optic cable and having a second input connected to said second lens, said optical coupler collecting the remote light at the first and second inputs and presenting the collected light to the photodiode affixed to the display unit such that the variation in the display characteristics of the display unit may be provided based at least in part upon the remote light intensity.

* * * * *